United States Patent [19]

Ackerman et al.

[11] 4,372,112
[45] Feb. 8, 1983

[54] THIN-WALLED EXHAUST GAS MANIFOLD CASTING

[75] Inventors: Allen D. Ackerman, Troy; Conrad G. Perkey, Dearborn Heights; Robert A. Martin, Northville; William M. Justusson, Farmington Hills, all of Mich.

[73] Assignee: Ford Motor Company, Dearborn, Mich.

[21] Appl. No.: 164,868

[22] Filed: Jul. 1, 1980

[51] Int. Cl.³ .............................. F01N 7/10; F01N 3/34
[52] U.S. Cl. ........................................ 60/323; 60/282; 60/302; 60/305
[58] Field of Search ................ 60/304, 305, 302, 278, 60/299, 323, 282

[56] References Cited

U.S. PATENT DOCUMENTS

| | | | |
|---|---|---|---|
| 2,217,241 | 10/1940 | Tendler | 60/305 |
| 3,413,803 | 12/1968 | Rosenlund | 60/282 |
| 3,981,145 | 9/1976 | Noguchi | 60/302 |
| 4,020,539 | 5/1977 | Vroman | 60/299 |
| 4,109,468 | 8/1978 | Kohama | 60/278 |
| 4,238,456 | 12/1980 | Jalbing | 60/299 |

FOREIGN PATENT DOCUMENTS

| | | | |
|---|---|---|---|
| 52-6817 | 1/1977 | Japan | 60/305 |
| 1195483 | 6/1970 | United Kingdom | 60/305 |

OTHER PUBLICATIONS

Karsay, S. I., *Ductile Iron Production Practices*, Amer. Foundrymen's Soc. 1975, pp. 24, 25, 90, 91, 142, 143.
Metal Progress: *Materials and Process Design Handbook*, 2nd Ed., 1970, pp. 24–26.
Mark's Mechanical Engineer's Handbook, 6th Ed., 1958, pp. 6–54, 55 and 56.

*Primary Examiner*—Douglas Hart
*Attorney, Agent, or Firm*—Joseph W. Malleck; Olin B. Johnson

[57] ABSTRACT

A thin-walled exhaust gas manifold casting structure for an internal combustion engine is disclosed. The manifold is comprised of nodular iron and has walls defining a plurality of inlet ducts interconnecting with a shallow elliptical outlet duct, the walls having a generally uniform thickness in the range of 0.12–0.15 inches. An integrally cast rib extends across at least a plurality of inlet ducts to reduce thermal flexing in service. The rib, subsequent to casting, is bored to define a hollow cylinder having ports communicating with most of the inlet ducts for carrying a secondary air supply. The inlet ducts are also arranged to achieve compactness in the overall envelope of the manifold by (a) restricting the dimension between the inlet duct openings and the outlet duct opening to less than the major axis of the elliptical outlet opening, (b) interconnecting the inlet ducts with the singular outlet duct along generally one side thereof, and (c) limiting the included angle between the plane containing the inlet openings and the plane containing the outlet opening to about 50°.

1 Claim, 6 Drawing Figures

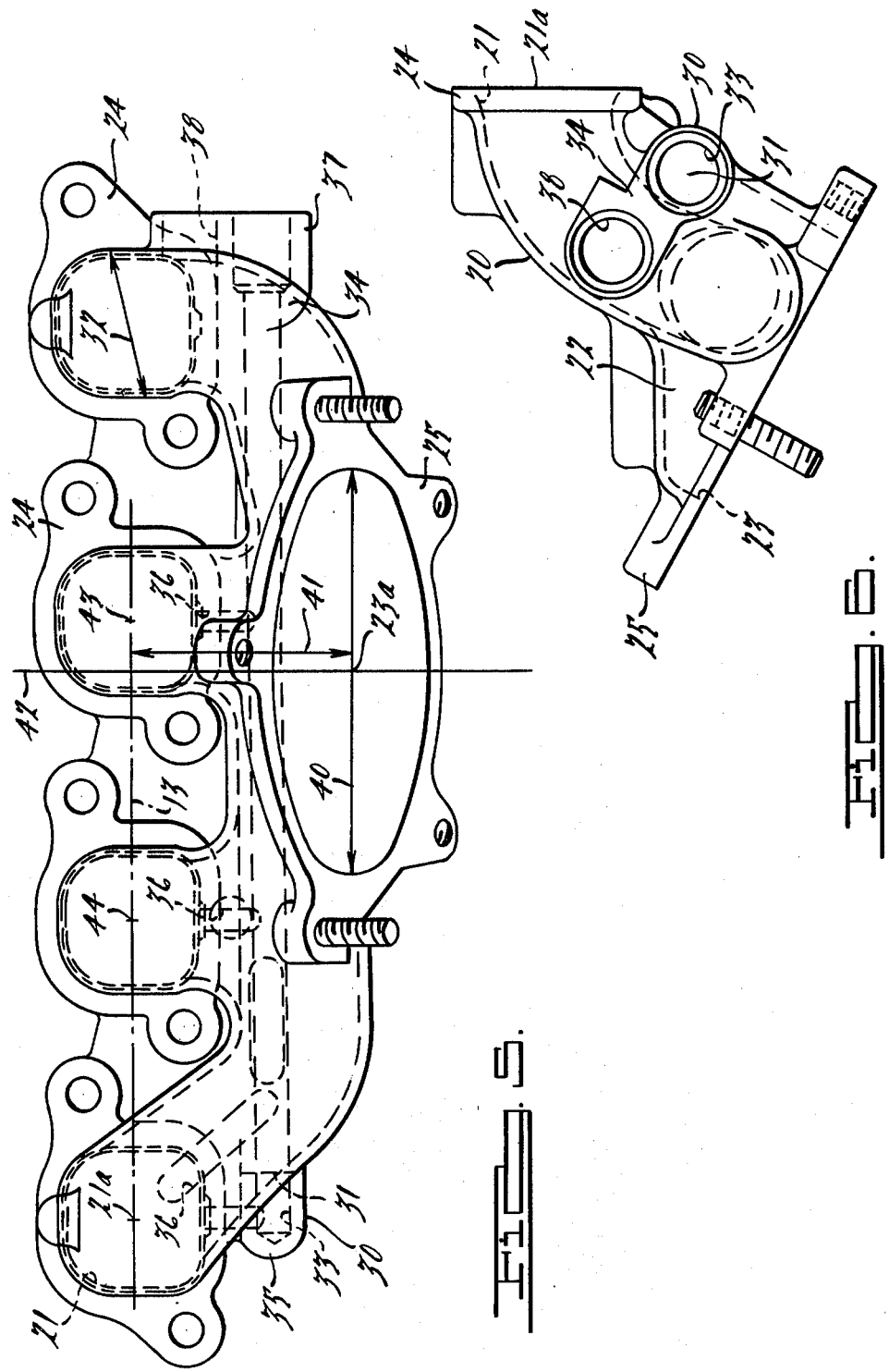

THIN-WALLED EXHAUST GAS MANIFOLD CASTING

BACKGROUND OF THE INVENTION

Engine manifolds heretofore have been typically formed of grey cast iron with heavy walls defining ducts or channels, each curving rearwardly from the exhaust ports of an engine to carry exhaust gas to a common pipe. However, in recent years exhaust gas temperatures have been increasing as a result of modifications to the combustion process to reduce emissions. Grey iron is affected by such temperatures, and thus strengthening ribs have been added to such manifolds contrary to another developing need for lighter weight.

The use of grey iron manifolds has been further aggravated by (a) the use in some instances of noncatalyzed secondary combustion in the exhaust manifold with or without the introduction of secondary air to facilitate additional emission cleanup, and (b) by the mounting of a catalytic converter directly on the manifold so that a dual stage emission cleanup can take place in close proximity to the source of emission. As a result, the exhaust gas temperature within the manifold is significantly elevated, which in turn demands greater high temperature strength characteristics from the manifold material.

These cummulative conditions place unusual thermal and physical requirements upon the construction of a manifold which, when coupled with the requirements for reduced weight in all engine components, cannot be met by the state of the prior art. Cast metals offer the most hope, but all lose some strength as operating temperatures increase. This strength problem is compounded if the walls of the manifold are reduced in thickness to save weight; a new structural design approach is needed to meet the above needs.

SUMMARY OF THE INVENTION

The invention is a cast metal exhaust gas manifold for an internal combustion engine, which manifold has reduced weight while maintaining high strength and dimensional stability under high thermal conditions. Such physical characteristics facilitate mounting of a catalytic converter directly thereon.

The manifold has a plurality of inlet ducts intersecting and communicating with a singular outlet duct, each of the ducts being thin-walled, as characterized by a generally uniform thickness in the range of 0.12-0.15 inches. The manifold is strengthened and rigidized by forming the casting of nodular iron (preferably low in carbides) and by having an integrally cast rib extending (preferably tangentially) across the plurality of inlet ducts to reduce flexing while in service. It is advantageous that the rib function additionally as a secondary air supply channel. To this end, the rib is hollowed, such as by boring, to define a channel which may communicate with each of the inlet ducts.

To achieve compactness and further weight reduction, the ducts are preferably organized as an array of separated tubes with the inlet tubes intersecting and communicating with generally one side of the outlet duct preferably formed with an elliptical cross-section. Also for compactness, the center of the elliptical outlet opening of the outlet duct is preferably spaced from a line containing the centers of the inlet openings for the inlet ducts a distance no greater than the major dimension of the ellipse. Still further for compactness, the outlet duct preferably has an extended central axis passing through the center of the elliptical opening and between the extended axes of the innermost inlet openings of the inlet ducts. The plane containing the inlet openings may also be oriented at an angle of about 50° with a plane containing the outlet opening of the outlet duct.

SUMMARY OF THE DRAWINGS

FIG. 5 is a view of the manifold casting taken substantially along line 5—5 of FIG. 1.

FIG. 6 is an end view of the construction illustrated in FIG. 5.

DETAILED DESCRIPTION

Figure 1:
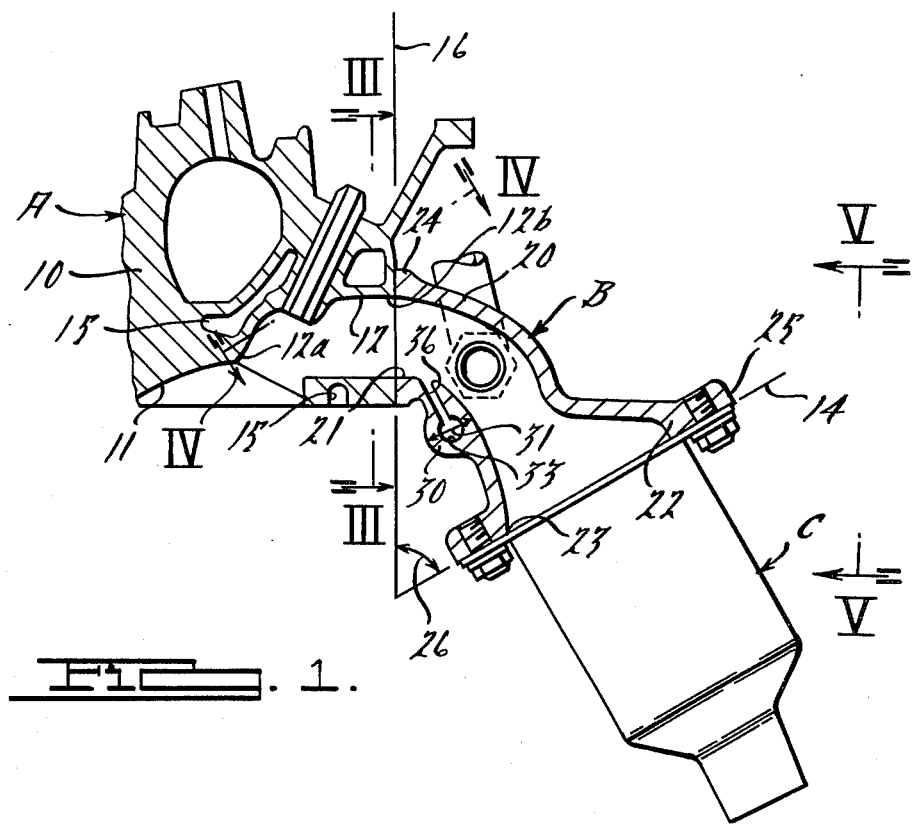
FIG. 1 is an elevational illustration of an assembly including an engine head, the exhaust manifold of the present invention, and a catalytic converter mounted on the manifold; only a portion of the engine head is illustrated and the head and manifold are shown in section.

FIG. 1 illustrates a portion of an automotive engine assembly showing the relation of the manifold construction B of this invention to other associated components A and C. The engine head A supports exhaust manifold B which in turn supports a catalytic converter C. The head may be preferably formed of aluminum which is cooled at sensitive locations by a water jacket 15. The manifold is formed of nodular cast iron which in part is thermally isolated from the head and converter by gasketing. Nonetheless, thermal gradients are created in the manifold due in part to the general temperature of the exhaust gas in contact with the inner walls of the ducts and in part to the extreme high temperature of the exhaust gas where it is secondarily combusted. The manifold tends to warp under these conditions creating distortion at the inlet flanges, causing the structure to eventually fail. The longer the duct length, the more this effect is exaggerated.

The exhaust gases are first generated in a plurality of cylinders 11 in the body 10 of the head. Exhaust ports 12 extend from each of the cylinders (at inlet opening 12a) to an outlet opening 12b.

Manifold B is rigidly mounted to the side of the engine head A by suitable fasteners. The manifold has a plurality of inlet ducts 20, each with inlet openings 21 aligned with an outlet opening 12b of the exhaust ports of the head. The inlet openings 21 of the inlet ducts lie in a common plane 16 and have centers 21a thereof generally aligned along a predetermined path 13 (here a straight line) as are the outlet openings of the exhaust ports 12b. The inlet ducts 20 interconnect and communicate with a shallow, singular outlet duct 22 having a generally elliptical cross-sectional configuration with a complimentary outlet opening 23. The catalytic converter C (which may be of a design as shown in U.S. Pat. No. 3,852,041 and 3,692,497) has a complimentary elliptical inlet opening which facilitates flow therethrough. The converter is hung rigidly on the manifold by suitable fasteners clamping a gasketing therebetween.

The inlet ducts of the manifold generally curve toward the center of the elliptical outlet duct of interconnect along generally one side of such elliptical duct. The ducts are independent sleeve structures, except where intersecting, which form a compact array. The walls of ducts 20 and 22 are maintained at a generally uniform thickness in the range of 0.12–0.15 inches throughout. The inlet ducts each may have a different compound curvature to meet with the outlet duct along the shortest curved path.

The inlet openings for each of the inlet ducts lie in a common plane 16 which is oriented at an angle of about 50° from the plane 14 containing the outlet opening of the outlet duct. Flanges 24 and 25 are formed about each of the inlet openings and the elliptical outlet opening, such flanges provide an adequate flat surface, when machined, against which a gasket may bear to promote sealing between the head and manifold, or manifold and converter. Additionally, the flanges provide support pads for mechanical fastening devices.

An integrally cast rib 30 extends across the inlet ducts 20 and interconnects tangentially therewith to act as a reinforcement against flexing. The rib as cast is a solid cylinder with a diametrical dimension 31 only slightly smaller than a diameter 32 of an inlet opening for each of the inlet ducts. After casting, the rib is machined, such as by boring, to define a hollow cylinder 33 extending from one end 34 of the rib to just short of the opposite end 35 maintaining a closure thereat. The hollow cylinder 33 acts as a supply channel for secondary air which is admitted to each of the inlet ducts 20 (except one from which EGR is withdrawn) through respective communicating ports 36 thereby providing for enhanced secondary combustion of the heated exhaust gases. The rib 30 has an enlarged neck 37 at one end which facilitates the machining of a second, but shorter, bore 38 which communicates with the first of said inlet ducts 20 thereby providing for exhaust gas recirculation from that one duct to the engine induction system.

The manifold casting is formed of nodular iron which is processed to be low in carbides. This is brought about by (a) controlling the chemistry of the molten metal to be treated to have 3.5–4.2% C, 1.5–2.4% Si, and no greater than 0.65% carbide formers (Cr or Mn), and (b) treating the molten iron for nodularization/inoculation in the mold as the molten metal flows to the casting cavity. The nodular iron will have a metal tensile strength in the range of 60–70 ksi, and a yield strength of about 40–50 ksi, with about 6% elongation.

Figure 2:
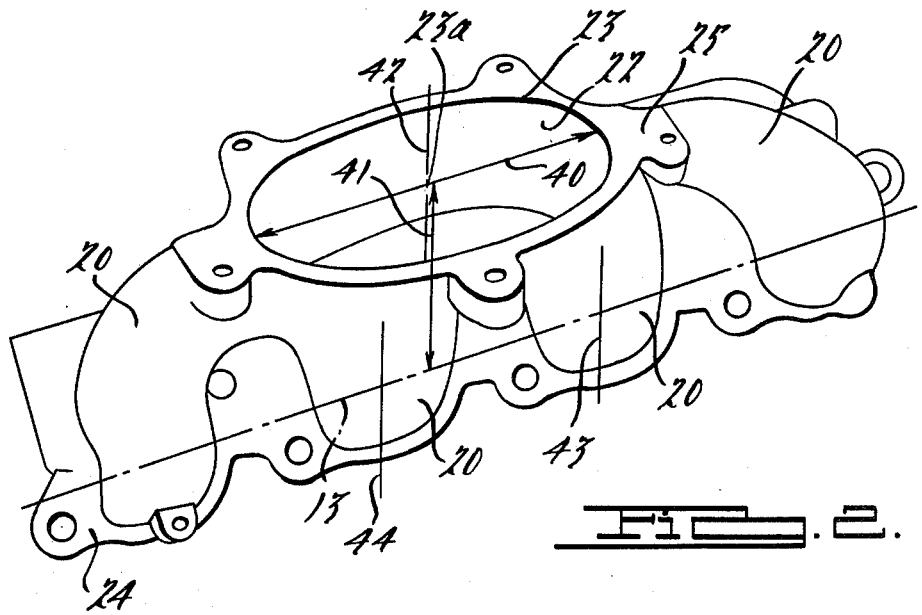
FIG. 2 is an enlarged perspective view of the exhaust manifold of FIG. 1.
Figure 4:
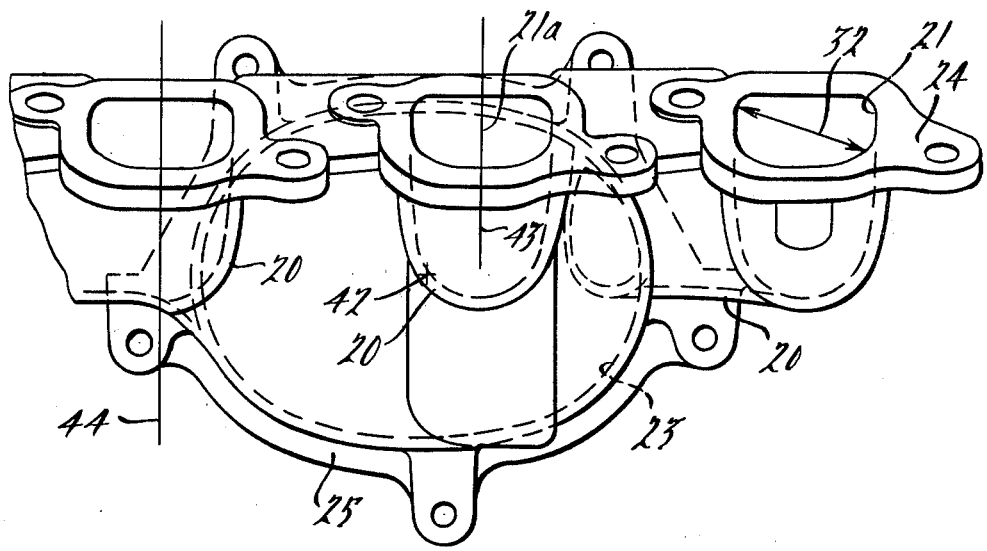
FIG. 4 is a view of the manifold casting, again partially broken away, taken substantially along line 4—4 of FIG. 1.
Figure 3:
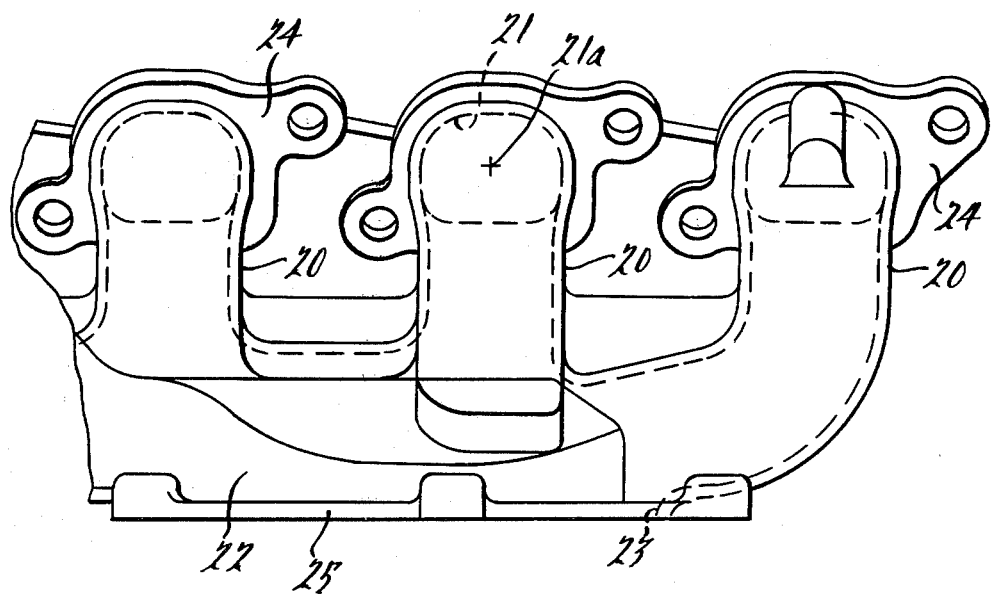
FIG. 3 is a view of the manifold casting, partially broken away, taken substantially along line 3—3 of FIG. 1.

The array of inlet ducts of the manifold is specifically arranged so that the distance 41 between the center 23a of the elliptical outlet opening 23 and the line 13 containing the centers 21a of the inlet openings 21 of each of the inlet ducts 20 is no greater than the length of the major axis 40 of the elliptical opening 22a (see FIG. 2).

The outlet duct 22 is also oriented with respect to the inlet openings 21 of the inlet ducts 20 so that the central axis 42 of the outlet duct 22, when extended, will pass between the axes 43–44 extending through the centers of the innermost inlet ducts (see FIG. 5). In addition, the inlet ducts interconnect with the outlet duct substantially along one side of the latter (see FIG. 2). In this manner, the connecting paths of the inlet ducts with the outlet duct is minimized thereby reducing weight and minimizing gas flow losses.

The planes 16–14 respectively containing the aligned inlet openings and the outlet opening of the manifold are oriented to have an included angle therebetween of about 50°. This angle orientation is desirable because it provides a direct approach for the exhaust gas as it enters the attached catalytic converter and enables the overall manifold to be more compact.

The temperature of the exhaust gases traveling through the manifold will generally be in the range of 1250°–1350° F. When secondary air is introduced to each of the ducts, there will be an increase of temperature to the range of 1450°–1550° F. As the exhaust gases are discharged from the manifold into the catalytic converter, the exhaust gases will typically be in the temperature range of 1650°–1750° F. Only nodular cast iron as employed herein can withstand these temperatures and maintain adequate strength to support a catalytic converter hung thereon. But to reduce structural weight requires redesign of the manifold in accordance with the above teaching to retain such strength and to withstand warpage and flexing.

We claim:

1. An exhaust gas manifold casting for an internal combustion engine, comprising:
   (a) inlet duct walls defining a plurality of inlet ducts each having an inlet opening, said inlet openings being arranged in a common plane and having the centers of said inlet openings lying along a straight line;
   (b) outlet duct walls defining a singular shallow outlet duct intersecting and communicating with said inlet ducts, said outlet duct describing an ellipse in cross section and having an outlet opening with a center located from said straight line a distance no greater than the major dimension of said elliptical cross section, said outlet duct having an axis passing through the center of said elliptical cross section and projecting between axes extending through the centers of the inlet openings of the innermost inlet ducts, said outlet and inlet duct walls consisting essentially of nodular cast iron and having a generally uniform wall thickness in the range of 0.12–0.15 inches; and
   (c) an integrally cast rib extending across at least a plurality of said inlet ducts to reduce flexing of said manifold in service.

* * * * *